United States Patent Office 2,988,555
Patented June 13, 1961

2,988,555
12α-HALO STEROIDS OF THE PREGNANE SERIES
Josef Fried and Josef E. Herz, New Brunswick, N.J., assignors to Olin Mathieson Chemical Corporation, New York, N.Y., a corporation of Virginia
No Drawing. Original application June 28, 1957, Ser. No. 668,596. Divided and this application Oct. 23, 1958, Ser. No. 788,246
3 Claims. (Cl. 260—397.45)

This application is a continuation-in-part of our parent application, Serial No. 519,682, filed July 1, 1955, and a division of our parent application, Serial No. 668,596, filed June 28, 1957.

This invention relates to the synthesis of valuable steroids; and has for its object the provision of (I) an advantageous process of preparing steroids of the pregnane (including the allopregnane, pregnene and pregnadiene) series having a 12α-halogen substituent and an 11-keto or 11β-hydroxy substituent, and of (II) certain steroids useful themselves as physiologically active steroids or in the preparation of physiologically active steroid derivatives.

The process of this invention essentially comprises: (a) converting an 11β,12β-epoxy steroid of the pregnane (including the allopregnane, pregnene, and pregnadiene) series into the corresponding 12α-halo-11β-hydroxy derivative thereof; (b) converting said 12α-halo-11β-hydroxy derivative to the corresponding 4β-bromo (or 2,4-dibromo) derivative, and thence by dehydrobromination to the corresponding $\Delta^4$-pregnene (or a mixture of the corresponding $\Delta^{1,4}$-pregnadiene and $\Delta^{4,6}$-pregnadiene) derivative (if the initial 11β,12β-steroid contains the requisite 4,5- and/or 1,2;4,5- and 4,5;6,7-unsaturation, step b can, of course, be eliminated); and (c) optionally oxidizing the 11β-hydroxy steroid, thus formed, to the corresponding 11-keto derivative.

The compounds of this invention comprise: (A) the intermediate 12α-halo-11β-hydroxy steroids of pregnane (including the allopregnane) series, wherein the halo radical is chlorine or fluorine (i.e. a halogen of atomic weight greater than 18 and less than 36); (B) the intermediate 12α-halo-4β-bromo-11β-hydroxy steroids of the pregnane series; (C) the intermediate 12α-halo-2,4-dibromo-11β-hydroxy steroids of the pregnane (including the allopregnane) series; and (D) the physiologically active 12α-halo-11β-hydroxy (or 11-keto)-$\Delta^4$-steroids of the pregnene (including the $\Delta^{1,4}$- and $\Delta^{4,6}$-pregnadiene) series.

For a clearer understanding of the foregoing general and following detailed description of the processes of this invention, reference is made to the following schematic analysis:

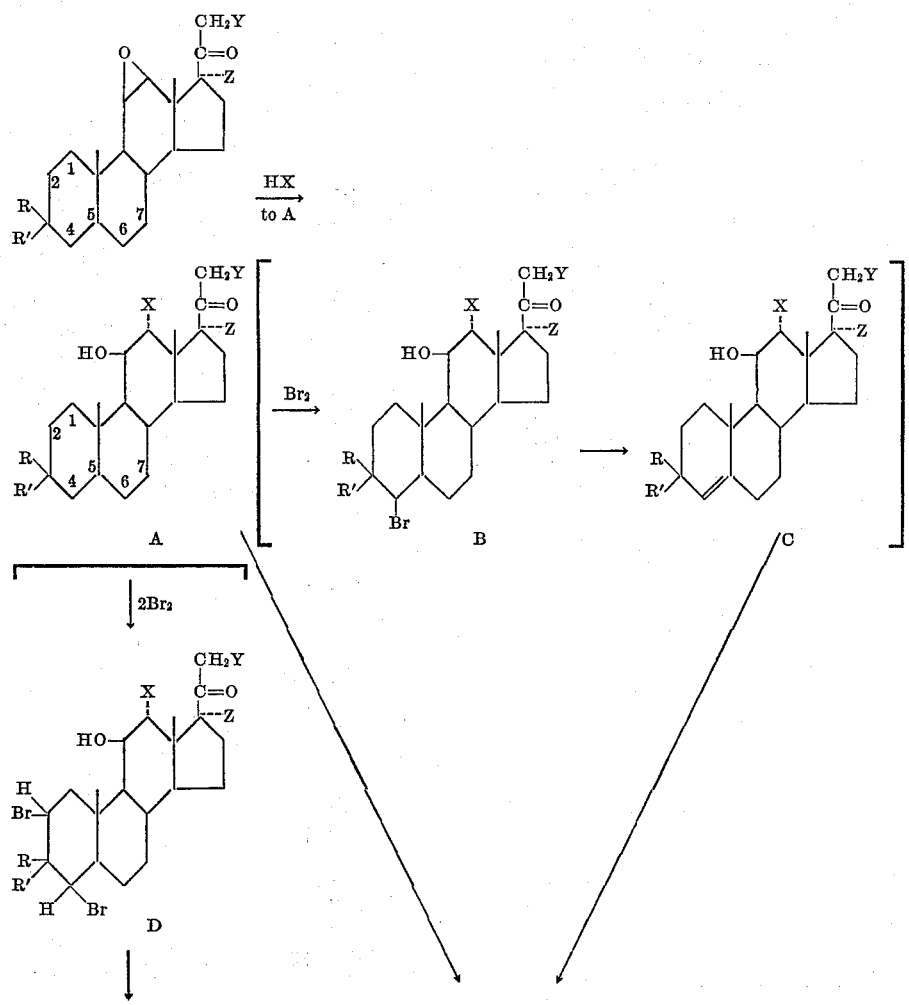

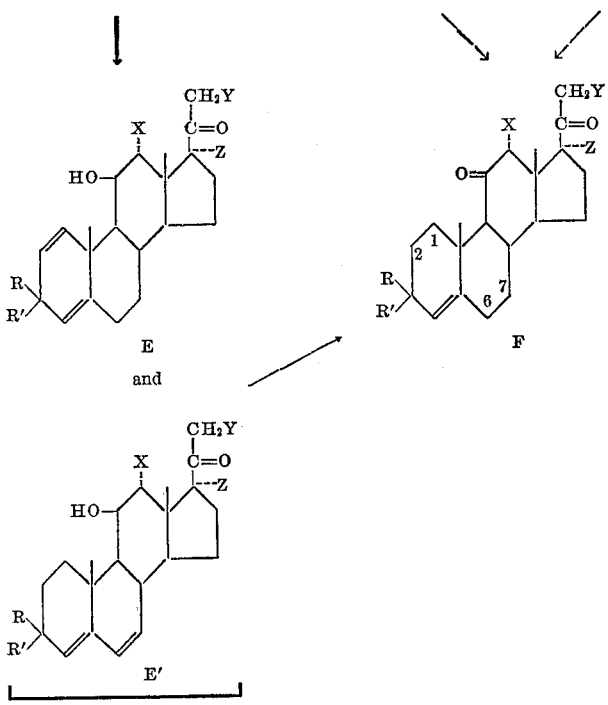

wherein the 1,2;4,5; and 6,7-positions are double-bonded or saturated, and wherein individually R is hydrogen, R' is hydroxy, or together R and R' is oxo (keto) or a group convertible thereto by hydrolysis (e.g. ketal), R and R' as keto being preferred, X is halogen [preferably a halogen of atomic weight greater than 18 and less than 36 (i.e. chlorine or fluorine)], Y is hydrogen, hydroxy, or acyloxy, and Z is hydrogen or α-hydroxy.

Compounds suitable as initial reactants in the process of this invention are disclosed in said application, Serial No. 519,682, and include preferably 11b,12b-epoxy-pregnane-3,20-dione and 11β,12β - epoxypregnane-21-ol-3,20-dione and esters thereof [particularly carboxylic acid esters such as hydrocarbon carboxylic acid esters having less than ten carbon atoms in the acid moiety, as exemplified by the lower alkanoic acid esters (e.g. the acetate, propionate, butyrate and enanthate), the monocyclic hydrocarbon aromatic carboxylic acid esters (e.g. the benzoate), the lower cycloalkanecarboxylic acid esters, the monocyclic hydrocarbon aralkanoic acid esters (e.g. the phenacetate), the lower alkenoic acid esters, and the lower cycloalkenecarboxylic acid esters], although other starting materials may also be used, such as: 11β,12β-epoxyprogesterone; 11β,12β-epoxy-Δ⁴-pregnene-21-ol-3,20-dione and esters thereof; 11β,12β - epoxy - Δ⁴ - pregnene-17α-ol-3,20 - dione; 11β,12β-epoxy-Δ⁴-pregnene-17α,21-diol-3,20-dione and esters thereof; 11β,12β-epoxypregnane-17α-ol-3,20-dione; 11β,12β-epoxypregnane-17α,21-diol-3,20-dione and esters thereof; 11β,12β-epoxy-Δ¹,⁴-pregnadiene-3,20-dione; 11β,12β-epoxy-Δ¹,⁴-pregnadiene-17α-ol-3,20-dione; 11β,12β-epoxy-Δ¹,⁴-pregnadiene-21-ol-3,20-dione and esters thereof; 11β,12β-epoxy-Δ¹,⁴-pregnadiene-17α,21-diol-3,20-dione and esters thereof; 11β,12β-epoxy-Δ⁴,⁶-pregnadiene-3,20-dione; 11β,12β-epoxy-Δ⁴,⁶-pregnadiene-17α-ol-3,20-dione; 11β,12β-epoxy-Δ⁴,⁶-pregnadiene-21-ol-3,20-dione and esters thereof; and 11β,12β-epoxy-Δ⁴,⁶-pregnadiene-17α,21-diol-3,20-dione and esters thereof.

These 11β,12β-epoxy steroids are reacted with a hydrogen halide (e.g. hydrobromic, hydroiodic, and preferably hydrofluoric and hydrochloric acid) in a suitable organic solvent, such as a halogenated alkane (e.g. chloroform), an alcohol (e.g. methanol), or an ether (e.g. dioxane).

By this reaction, Compounds A are formed, wherein the 12α-halo substituent corresponds to the halide of the hydrohalic acid of the reaction.

If the 11β,12β-epoxy reactant is saturated in the 1,2; 4,5; and 6,7 positions (such reactants being preferred), the resultant inactive Compounds A can be converted to physiologically active steroids by introducing a double-bond in the 4,5-position. This may be done by: (1) reacting Compound A, wherein the steroid nucleus is saturated and of the pregnane configuration, with approximately one mole of bromine per mole of steroid, thereby forming Compounds B containing a 4β-bromo substituent, and dehydrobrominating as by treatment with an alkali metal halide (such as an alkali metal chloride, as exemplified by lithium chloride) or with a hydrazine derivative (e.g. dinitrophenylhydrazine or semicarbazide) to form the corresponding hydrazone or semicarbazone, followed by decomposition of the latter with a keto acid (e.g. pyruvic acid) to yield a Δ⁴-pregnene, Compounds C, which correspond to starting Compounds A except that the 4,5-position is double-bonded; or (2) reacting Compounds A, wherein the steroid nucleus is saturated and may be either of the pregnane or allopregnane configuration, with at least two moles of bromine per mole of steroid, thereby forming Compounds D containing a 2,4-dibromo substituent (2α,4α if Compounds A are allopregnanes and 2β,4β if Compounds A are pregnanes), and dehydrobrominating by treatment with an organic base such as pyridine or collidine, to prepare a mixture (which is separable by chromatography) of a Δ¹,⁴-pregnadiene, Compounds E, and a Δ⁴,⁶-pregnadiene, Compounds E'. These derivatives correspond to starting Compounds A except that the 4,5-position and one of the positions 1,2 or 6,7 is double-bonded.

Compounds A, C, E, and E' can be oxidized, if desired, to the corresponding 11-keto derivatives, Compounds F, by treatment with an oxidizing agent such as a hexavalent chromium compound (e.g. chromic acid).

The new 12α-halo-11β-hydroxy (or 11-keto)-Δ⁴-pregnene (including the pregnadiene) steroids of this invention (Compounds C, E, E′, and F) and particularly those of the general formula

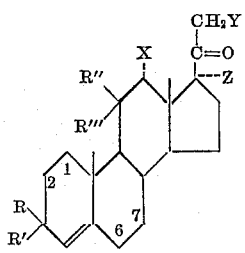

wherein the 1,2- and 6,7-positions are saturated or double-bonded; R, R′, X, Y and Z are as hereinbefore defined; and individually R″ is hydrogen, R‴ is hydroxy, and together R″ and R‴ represents keto, are physiologically active steroids which possess glucocorticoid as well as mineralocorticoid activity. Thus, the new steroids of this invention can be administered instead of, and in the same manner as, cortisone or hydrocortisone in the treatment of rheumatoid arthritis and dermatomyositis, or in the same manner as desoxycorticosterone in the treatment of Addison's disease or adrenal insufficiencies. The dosage for such administration is, of course, dependent on the relative activity of the compound. Thus, where the steroid derivative has approximately the same activity of cortisone, the dosage of the former to be employed should be approximately equal to the employed dosage of the latter. The 12α-bromo-11-keto- steroids of this invention are of further use as intermediates in the preparation of the corresponding 12-debromo derivatives, to which they are converted by treatment either with zinc in acetic acid or chromous chloride.

For the purpose of illustrating the preferred process of this invention, reference is made to the following schematic analysis employing 11β,12β-epoxy-pregnane-3,20-dione as the starting material:

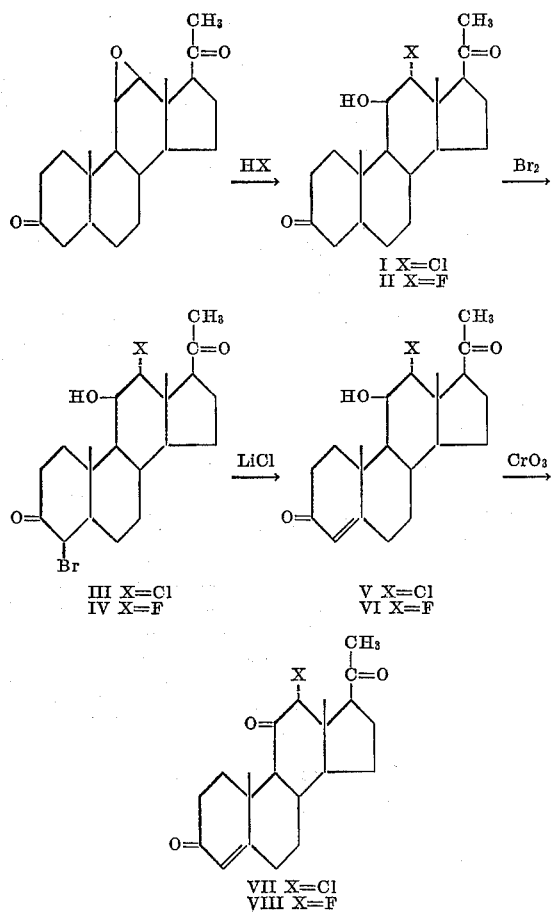

The following examples are illustrative of the invention (all temperatures being in centigrade):

EXAMPLE 1

*12α-chloropregnane-11β-ol-3,20-dione (I)*

To a solution of 63 mg. of 11β,12β-epoxypregnane-3,20-dione in 10 ml. of pure dioxane is added 2.5 ml. of 2.5 N aqueous hydrochloric acid. The mixture is stirred at room temperature for 1 hour after which 30 ml. of chloroform is added. Separation of the layers followed by washing of the chloroform-dioxane phase with dilute sodium bicarbonate solution and with water and subsequent drying over sodium sulfate furnishes after evaporation of the solvent in vacuo about 65 mg. of essentially pure 12α-chloropregnane-11β-ol-3,20-dione (I): M.P. about 241–244° (dec.). The analytically pure substance has the following properties: M.P. about 246–248° (dec.); $[\alpha]_D^{23}+80°$ (c, 0.31 in chloroform)

$\lambda_{max.}^{Nujol}$ 2.96μ (OH), 5.83μ (3-keto), 5.95μ (20-keto)

*Analysis.*—Calcd. for $C_{21}H_{31}O_3Cl$ (366.92): C, 68.74; H, 8.52; Cl, 9.66. Found: C, 69.16; H, 8.50; Cl. 9.36.

EXAMPLE 2

*12α-fluoropregnane-11β-ol-3,20-dione (II)*

To a solution of 250 mg. of 11β,12β-epoxypregnane-3,20-dione in 24 ml. of chloroform and 1.25 ml. of ethanol is added at 0° with stirring hydrogen fluoride until two layers become definitely discernible. The mixture is stirred for a total of 1 hour and 25 minutes at 0° and is then neutralized by the addition of an aqueous suspension of sodium bicarbonate. The chloroform layer is washed with water, dried over sodium sulfate and evaporated to dryness in vacuo. The residue on crystallization from acetone-hexane furnishes about 94 mg. of 9α-fluoropregnane-12β-ol-3,20-dione having the following properties: M.P. about 187–189°; $[\alpha]_D^{23}$ —4° (c, 0.96 in chloroform);

$\lambda_{max.}^{Nujol}$ 2.93μ (OH), 5.86μ (3-keto), 5.92μ (20-keto)

$\lambda_{max.}^{alc.}$ No specific absorption.

*Analysis.*—Calcd. for $C_{21}H_{31}O_3F$ (350.42): C, 71.98; H, 8.90; F, 5.43. Found: C, 72.01; H, 8.98; F, 5.50.

The combined mother liquors from the above crystallization are dried in vacuo and the resulting residue dissolved in 4 ml. of benzene and 4 ml. of hexane for chromatography on 3.46 g. of acid-washed alumina. Elution with equal volumes of benzene-hexane elutes amorphous impurities, which are followed by crystalline fractions when the eluant is changed to benzene (400 ml.) and 5% chloroform in benzene (450 ml.). Recrystallization of these fractions from acetone-hexane gives 12α-fluoropregnane-11β-ol-3,20-dione (II) of the following properties: M.P. about 170–172°; $[\alpha]_D^{23}+91°$ (c, 0.54 in chloroform);

$\lambda_{max.}^{Nujol}$ 2.95μ, 5.87μ

*Analysis.*—Calcd. for $C_{21}H_{31}O_3F$ (350.42): C, 71.98; H, 8.90. Found: C, 71.50; H, 9.19.

If 11β,12β-epoxypregnane-21-ol-3,20-dione 21-acetate, 11β,12β-epoxy-Δ⁴-pregnene-3,20-dione, or 11β,12β-epoxy-Δ⁴-pregnene-21-ol-3,20-dione 21-acetate is substituted for 11β,12β-epoxypregnane-3,20-dione in the procedure of Example 1 or 2, the corresponding 12α-chloro-11β-hydroxy and 12α-fluoro-11β-hydroxy steroid derivatives are prepared, respectively.

EXAMPLE 3

*4β-bromo-12α-chloropregnane-11β-ol-3,20-dione (III)*

To a solution of 50 mg. of 12α-chloropregnane-11β-ol-3,20-dione in 10 ml. of glacial acetic acid is added a drop of 10% hydrogen bromide in acetic acid and then dropwise a solution of 25 mg. of bromine in 1 ml. of glacial acetic acid. After addition of 30 mg. of solid sodium acetate, the solvent is removed in vacuo and the residue taken up in chloroform. The resulting chloroform solution is washed with dilute sodium bicarbonate and water and after drying over sodium sulfate evaporated to dryness. The crystalline residue (about 75 mg.) consists of essentially pure 12α-chloro-4β-bromopregnane-11β-ol-3,20-dione, M.P. about 184–186° (dec.); [α]$_D^{23}$+100° (c, 0.5 in chloroform);

$\lambda_{max.}^{Nujol}$ 2.95μ (OH), 5.78μ (4-bromo-3-ketone), 5.92μ (20-keto).

EXAMPLE 4

4β-bromo-12α-fluoropregnane-11β-ol-3,20-dione (IV)

Following the procedure of Example 3 but substituting 50 mg. of 12α-fluoropregnane-11β-ol-3,20-dione for the 12α-chloro reactant, about 70 mg. of 4β-bromo-12α-fluoropregnane-11β-ol-3,20-dione are obtained.

Similarly, 12α-chloropregnane-11β,21-diol-3,20 - dione 21-acetate and 12α-fluoropregnane-11β,21-diol-3,20-dione 2-acetate can be converted to 4β-bromo-12α-chloropregnane-11β,21-diol-3,20-dione 21-acetate and 4β-bromo-12α-fluoropregnane-11β,21-diol-3,20-dione 21-acetate, respectively.

EXAMPLE 5

12α-chloro-Δ⁴-pregnene-11β-ol-3,20-dione [12α-chloro-11β-hydroxyprogesterone] (V)

A solution of 73 mg. of 12α-chloro-4β-bromo-pregnane-11β-ol-3,20-dione and 135 mg. of anhydrous lithium chloride in 5 ml. of redistilled dimethylformamide is heated at 100° under nitrogen for 2 and one-half hours. The solution is then diluted with chloroform and extracted with water, dilute sodium bicarbonate solution and again with water. After drying over sodium sulfate the solvent is evaporated in vacuo leaving a crystalline residue (about 47 mg.) of essentially pure 12α-chloro-Δ⁴-pregnene-11β-ol-3,20-dione. The latter is obtained in pure form after recrystallization from acetone-hexane and has the following properties: M.P. about 233–234°; [α]$_D^{23}$+162° (c, 0.60 in chloroform);

$\lambda_{max.}^{alc.}$ 239 mμ (ε=17,000)

$\lambda_{max.}^{Nujol}$ 2.98μ (OH), 5.97μ (20-keto), 6.17μ (Δ⁴-3-ketone)

12α - chloro-Δ⁴-pregnene-11β-ol-3,20 - dione possesses about one-half the activity of cortisone acetate in the rat liver glycogen assay.

EXAMPLE 6

12α-fluoro-Δ⁴-pregnene-11β-ol-3,20-dione [12α-fluoro-11β-hydroxyprogesterone] (VI)

Following the procedure of Example 5 but substituting 72 mg. of 12α-fluoro-4β-bromopregnane-11β-ol-3,20-dione for the 12α-chloro-4β-bromopregnane-11β-ol-3,20-dione, there is obtained about 45 mg. of 12α-fluoro-Δ⁴-pregnene-11β-ol-3,20-dione.

12α-fluoro-Δ⁴-pregnene-11β-ol-3,20-dione possesses activity equal to hydrocortisone in the liver glycogen assay.

Similarly, 4β-bromo-12α-chloropregnane - 11β,21-diol-3,20-dione 21-acetate and 4β-bromo-12α-fluoropregnane-11β,21-diol-3,20-dione 21-acetate can be converted to 12α-chlorocorticosterone 21-acetate and 12α-fluorocorticosterone 21-acetate, respectively.

EXAMPLE 7

12α-chloro-Δ⁴-pregnene-3,11,20-trione [12α-chloro-11-ketoprogesterone] (VII)

To a solution of 10 mg. of 12α-chloro-Δ⁴-pregnene-11β-ol-3,20-dione in 1 ml. of glacial acetic acid is added a solution of 3.5 mg. of chromium trioxide in 1 ml. of glacial acetic acid. Ten minutes later the chromium trioxide is destroyed by the addition of one-fourth ml. of ethanol and the solution concentrated to a syrup in vacuo. The residue is taken up in chloroform and extracted with water, dilute sodium bicarbonate and again with water. After drying over sodium sulfate, the chloroform is evaporated in vacuo and the semi-crystalline residue chromatographed on 200 mg. of sulfuric acid-washed alumina. Elution of the column with a mixture containing 25% benzene and 75% hexane furnishes crystalline material which on recrystallization from 95% ethanol melts at about 152–154°; [α]$_D^{24}$+130° (c, 1.00 in chloroform);

$\lambda_{max.}^{alc.}$ 237 mμ (ε=15,100)

$\lambda_{max.}^{Nujol}$ 5.83–5.87μ, 5.97μ, 6.16μ.

12α-chloro-Δ⁴-pregnene-3,11,20-trione possesses about one-half of the activity of cortisone acetate in the rat liver glycogen assay.

EXAMPLE 8

12α-fluoro-Δ⁴-pregnene-3,11,20-trione [12α-fluoro-11-ketoprogesterone] (VIII)

Following the procedure of Example 7 but substituting 10 mg. of 12α-fluoro-Δ⁴-pregnene-11β-ol-3,20-dione for the 12α-chloro reactant, there is obtained 12α-fluoro-Δ⁴-pregnene-3,11,20-trione.

In a similar manner, 12α-chlorocorticosterone 21-acetate and 12α-fluorocorticosterone 21-acetate are oxidized to 12α-chloro-11-dehydrocorticosterone acetate and 12α-fluoro-11-dehydrocorticosterone acetate, respectively.

The invention may be otherwise embodied within the scope of the appended claims.

What is claimed is:

1. 4β - bromo - 12α - halopregnane - 11β - ol - 3,20-dione, wherein the halogen has an atomic weight greater than 18 and less than 36.

2. 4β - bromo - 12α - chloropregnane - 11β - ol - 3,20-dione.

3. A steroid of the general formula

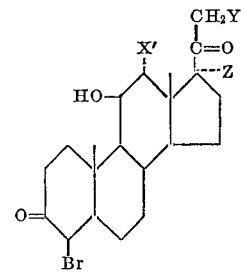

wherein X′ is selected from the group consisting of chloro and fluoro, Y is selected from the group consisting of hydrogen, hydroxy and the acyloxy radical of a hydrocarbon carboxylic acid of less than ten carbon atoms, and Z is selected from the group consisting of hydrogen and α-hydroxy.

References Cited in the file of this patent

UNITED STATES PATENTS

| | | |
|---|---|---|
| 2,554,472 | Ruschig | May 22, 1951 |
| 2,590,978 | Kendall et al. | Apr. 1, 1952 |
| 2,596,563 | Kaufmann et al. | May 13, 1952 |
| 2,782,211 | Wettstein et al. | Feb. 19, 1957 |
| 2,790,814 | Hogg et al. | Apr. 30, 1957 |
| 2,866,799 | Beyler et al. | Dec. 30, 1958 |
| 2,879,279 | Van der Burg | Mar. 24, 1959 |
| 2,924,612 | Hirschmann et al. | Feb. 9, 1960 |

OTHER REFERENCES

Shoppee: "Chemistry of the Steroids" (London: Butterworths Scientific Publications, 1958), pages 185 and 186.